US005548097A

United States Patent [19]

Couch, Jr et al.

[11] Patent Number: 5,548,097

[45] Date of Patent: Aug. 20, 1996

[54] PLASMA ARC CUTTING TORCH IGNITION CIRCUIT AND METHOD PROVIDING A FORCED ARC TRANSFER FUNCTION

[75] Inventors: Richard W. Couch, Jr, Hanover, N.H.; Lifeng Luo, Mayfield Heights, Ohio; Jeffrey L. Peterson, Lebanon, N.H.

[73] Assignee: Hypertherm, Inc., Hanover, N.H.

[21] Appl. No.: 361,730

[22] Filed: Dec. 22, 1994

Related U.S. Application Data

[63] Continuation-in-part of Ser. No. 39,898, Mar. 30, 1993, Pat. No. 5,416,297.

[51] Int. Cl.[6] .................................................... B23K 10/00

[52] U.S. Cl. ............................... 219/121.57; 219/121.54; 219/121.44

[58] Field of Search ........................ 219/121.39, 121.44, 219/121.54, 121.57, 130.4, 121.59

[56] References Cited

U.S. PATENT DOCUMENTS

| | | | |
|---|---|---|---|
| 3,558,973 | 1/1971 | Pochert et al. | 315/111 |
| 3,809,850 | 5/1974 | Saenger, Jr. | 219/121.57 |
| 4,225,769 | 9/1980 | Wilkins | 219/130 |
| 4,280,042 | 7/1981 | Berger et al. | 219/121 |
| 4,692,582 | 9/1987 | Marhic | 219/121 |
| 4,814,577 | 3/1989 | Dallavalle et al. | 219/121 |
| 4,839,499 | 6/1989 | Kotecki et al. | 219/121 |
| 4,943,699 | 7/1990 | Thommes | 219/121 |
| 4,996,407 | 2/1991 | Traxler | 219/121 |
| 5,036,176 | 7/1991 | Yamaguchi et al. | 219/121 |
| 5,086,205 | 2/1992 | Thommes | 219/121 |
| 5,111,024 | 5/1992 | Patron et al. | 219/121.54 |
| 5,170,030 | 12/1992 | Solley et al. | 219/121 |
| 5,296,665 | 3/1994 | Peterson et al. | 219/121.57 |

*Primary Examiner*—Mark H. Paschall
*Attorney, Agent, or Firm*—Testa, Hurwitz & Thibeault

[57] ABSTRACT

Circuitry and methods for reducing nozzle wear during starting of a plasma arc torch, even with a large standoff distance from a workpiece is described. The invention features a method of starting a plasma arc torch for cutting a workpiece using a pilot voltage to ionize a plasma gas and generate a pilot arc between an electrode and a nozzle. The method expedites the transfer of the arc from the nozzle to the workpiece by passing a generally smooth signal through the electrode before, during and after the arc transfers to the workpiece. A high frequency high voltage starting circuit is constructed with a pilot arc circuit isolated from a transfer arc circuit. A signal is generated which has a magnitude sufficient to ionizes a plasma gas to generate a pilot arc between the electrode and the nozzle and has a magnitude which generally increases after the pilot arc has been generated in order to expedite the transfer of the arc. The signal magnitude is, however, low enough to minimize transfer of the arc back to the nozzle.

21 Claims, 3 Drawing Sheets

PLASMA ARC CUTTING TORCH IGNITION CIRCUIT AND METHOD PROVIDING A FORCED ARC TRANSFER FUNCTION

RELATED APPLICATIONS

This application is a continuation-in-part of U.S. Ser. No. 08/039,898, filed Mar. 30, 1993now U.S. Pat. No. 5,416, 297.

FIELD OF THE INVENTION

The invention relates generally to the field of plasma arc torches and cutting processes. In particular, the invention relates to circuitry and methods for reducing nozzle wear during starting of a plasma arc torch, even with a large standoff distance from a workpiece.

BACKGROUND OF THE INVENTION

A significant problem in the development of plasma arc torch cutting technology has been reliable ignition and transfer of the plasma arc. Specifically, it is difficult to start a transferred arc between the electrode and the workpiece due to the relatively long standoff distance separating them. Consequently, most plasma cutting systems ignite a pilot arc between the electrode and the nozzle, which are separated by a much shorter distance. The arc eventually transfers to the workpiece, thereby providing a transferred arc between the electrode and the workpiece.

There are two principal ways to start the pilot arc. One technique is contact starting, one form of which is described in U.S. Pat. No. 4,791,268, assigned to Hypertherm, Inc. The most popular starting technique in use today, however, utilizes a high frequency, high voltage (HFHV) signal coupled to a D.C. power supply and to the torch. The HFHV signal is provided by a generator which is usually incorporated in a power supply or in a "console" connected to the torch by an electrical lead set. The HFHV signal induces a spark discharge in a plasma gas flowing between the electrode and a nozzle, typically in a spiral path. The discharge provides a current path. A pilot arc is formed between the electrode and the nozzle with a voltage across them.

The power supply is directly connected to the electrode and the workpiece. The gas flow through the nozzle is ionized by the pilot arc so that the electrical resistance between the electrode and the workpiece becomes small. The nozzle is connected to the workpiece through a series connection which includes a pilot resistor and a pilot relay. Because of the pilot resistor, a higher voltage is applied across the nozzle and the workpiece which induces the arc to transfer to the workpiece after the gap is ionized. The relay is closed prior to forming the pilot arc and opened a predetermined time after the arc transfers to the workpiece.

The time between forming the pilot arc and transferring the arc to the workpiece is a function of the distance between the torch and the workpiece (i.e. the standoff distance), the pilot arc current level, and the gas flow rate. The larger the standoff distance, the longer the transfer time.

Relatively long transfer times have been a significant problem in the development of plasma arc cutting torches and processes, particularly when the standoff distance is large. More specifically, the nozzle orifice can become damaged when the transfer time becomes too large. A high standoff distance is necessary when piercing thick metal plates (e.g. ½ inch or more) to protect the nozzle from splattering molten metal. Therefore, nozzle life is usually short when thick plates are being cut.

Current sharing between the nozzle and the workpiece during and immediately after arc transfer has been another problem in the development of plasma arc cutting torches and processes. In conventional starting circuitry the nozzle, pilot resistor, pilot relay and workpiece are connected in series. During the torch starting procedure, the nozzle voltage becomes equal to the workpiece voltage after the pilot arc transfers, but before the pilot relay is opened. For large standoff distances, voltage across the electrode and the workpiece is large, which makes the voltage across the electrode and the nozzle large. Therefore, current has more tendency to either partially or fully return to the nozzle by breaking the thin (low potential) gap between the plasma column and the nozzle orifice. As such, the transferred arc jumps back and forth between the workpiece and the nozzle before the pilot relay opens. Because a certain time delay unavoidably exists between detecting arc transfer and opening the pilot arc relay, the nozzle orifice becomes damaged even with current sharing times on the order of several milliseconds.

A seemingly straightforward solution is to increase the level of the pilot current. The expectation is that this increase will in turn increase the level of ionized gas between the electrode and the workpiece causing the transfer time to decrease and to eliminate current sharing. In practice, however, this solution does not work. When the standoff distance is relatively high, the nozzle and the workpiece inevitably share the pilot current for a period of time. Such current sharing causes an excessively long pilot arc time which results in damage to the nozzle.

Another seemingly straightforward solution is to increase the value of a pilot resistor so that the voltage between the nozzle and the workpiece becomes greater. This change does help expedite the transfer of the pilot arc to the workpiece, but a practical upper limit exists on the value of the resistor. For example, if the open circuit voltage of the D.C. power supply is about 300 volts, and since the pilot arc requires a certain amount of voltage (e.g. 100–150 volts), the voltage drop available across the pilot resistor is limited to about 150–200 volts. Given the limited potential and the fact that the higher the value of the resistor used, the lower the pilot current will be, the resulting pilot arc current reaches a level that is insufficient to ionize the gap. As a result, arc transfer does not occur. For a pilot arc current of about 50 amps with a 300 volt (open circuit voltage) D.C. power supply powering a torch with conventional starting circuitry, the maximum value of the pilot resistor is about 3–4 ohms. A larger resistor value would result in a pilot arc current which is not large enough to ionize the gap between the electrode and the workpiece. A plasma arc starting circuit set forth in the parent application, commonly assigned to Hypertherm Inc., reduces nozzle wear during starting of a plasma arc torch. This circuit isolates a pilot arc circuit and a transferred arc circuit before starting the pilot arc so that the transferred arc cannot utilize the pilot arc circuit. This isolation is accomplished by using two independently charged resistor capacitor networks to provide the initial pilot arc and transferred arc current. The duration and the value of the energy flow in the pilot arc circuit is controlled electronically to be sufficiently long enough to ignite the transferred arc but is short enough not to damage the nozzle. This circuit works well for reducing the nozzle wear with a torch standoff as high as one-half inch. One shortcoming related to this circuit is that the total current through the electrode suddenly increases when the arc transfers to the workpiece. This is because the current is the sum of the pilot arc and the transferred currents. For certain plasma cutting systems, the step increase of the electrode current causes an increase in electrode wear compared to the standard start circuit.

It is therefore a principal object of this invention to provide apparatus and a method of reliably starting and transferring the arc of a plasma arc cutting torch so as to reduce nozzle wear even when the torch to workpiece standoff distance is relatively large.

Another object is to provide a smooth electrode current waveform during arc transfer so that the electrode wear rate does not increase.

Yet another object is to provide a short duration pilot arc so that the nozzle damage is minimized.

Another object is to provide a plasma arc torch and starting circuit capable of working with different types of consumable and different types of plasma gases.

SUMMARY OF THE INVENTION

A principal discovery of the present invention is that the standard plasma torch start circuit with a pilot resistor between the nozzle and the workpiece causes nozzle wear when a relatively high torch to work standoff is used as described previously. The reason is that the nozzle voltage becomes equal to that of the workpiece immediately after the arc transfers since the current through the pilot arc resistor goes to zero; and the large voltage difference between the electrode and the nozzle results in the arc being directed back to the nozzle. The arc jumping back and forth between the nozzle and the workpiece before the pilot relay opens causes damage to the nozzle orifice.

The present invention features circuitry and methods for reducing nozzle wear during starting of a plasma arc torch, even with a large standoff distance from a workpiece.

The invention features a method of starting a plasma arc torch for cutting a workpiece using a pilot voltage to ionize a plasma gas and generate a pilot arc between an electrode and a nozzle. The method expedites the transfer of the arc from the nozzle to the workpiece by passing a generally smooth current through the electrode before, during and after the arc transfers to the workpiece. The method includes connecting a power source to the electrode, the nozzle and the workpiece by an electrical circuit. In particular, a D.C. power source may be used. A relay is closed that provides a voltage between the nozzle and the workpiece. The torch may be ignited by a high-frequency high-voltage power source which has a magnitude sufficient to ionize a plasma gas and generate a pilot arc between the electrode and/nozzle. In addition, the nozzle to work voltage has a magnitude which generally increases after the pilot arc has been generated in order to expedite the transfer of the arc to the work piece. More particularly, the supply provides a varying voltage across a charge storage element, such as a capacitor, connected between the nozzle and the workpiece having a magnitude which increases after the pilot arc has been generated.

The nozzle to workpiece voltage is then maintained after the arc transfers to the workpiece at a generally constant magnitude. This voltage is sufficiently low to not affect the constant current operation of the pilot arc, but sufficiently high to allow the transferred arc to stabilize and prevent the arc from transferring back to the nozzle.

In another embodiment, the invention features a starting circuit which increases the voltage between a nozzle and a workpiece during pilot arc time in order to expedite transfer of the arc from the nozzle to the workpiece. A D.C. power source coupled to an electrode, a nozzle and a workpiece disposed adjacent the torch generates power to operate a torch. A high-frequency high- voltage power supply generates a signal that ignites the torch which begins charging a charge storage element, such as a capacitor, connected between the nozzle and the workpiece. The capacitor maintains the voltage at a high value until the transferred arc is stabilized. As a result, most of the current in the arc flows through the workpiece after the arc transfers because the voltage difference between the electrode and the nozzle is low. This occurs even with high torch to work standoffs. A resistor is connected in parallel with the capacitor so that once the arc has stabilized, the voltage discharges through a resistor.

The starting circuit may also include an inductor-capacitor surge injector circuit and a diode isolation network. The inductor-capacitor surge injector circuit produces a generally constant pilot arc current for a short time even if the voltage across the capacitor ramps up quickly. The diode network isolates the pilot arc circuit from the transfer circuit.

A plasma arc torch incorporating the principle of the present invention offers significant advantages in reliability and maintainability. One advantage is that operators of plasma arc torches can reliably start and transfer the arc. Another advantage is that a short duration pilot arc and a smooth electrode current waveform during arc transfer is provided which reduces nozzle wear even when the torch to workpiece standoff distance is relatively large. Yet another advantage is that the principles of the present invention apply to different types of consumable and different types of plasma gases.

BRIEF DESCRIPTION OF THE DRAWINGS

The foregoing and other objects, features and advantages of the invention will become apparent from the following more particular description of preferred embodiments of the invention, as illustrated in the accompanying drawings. The drawings are not necessarily to scale, emphasis instead being placed on illustrating the principles of the present invention.

DETAILED DESCRIPTION OF THE INVENTION

Figure 1:
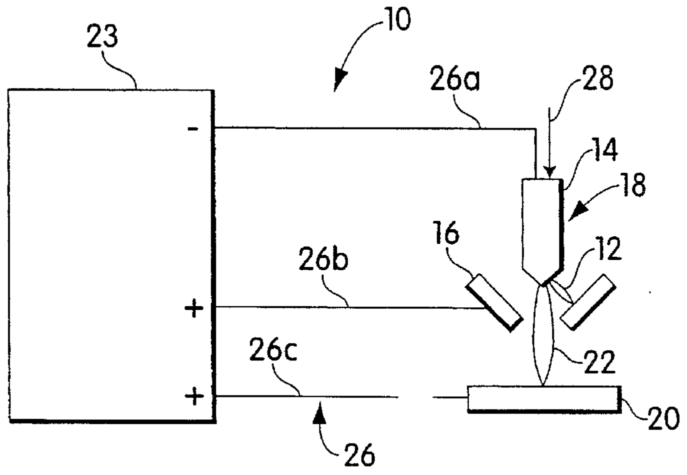
Fig. 1 (Prior Art)
FIG. 1 is a highly simplified schematic diagram of a transferred arc plasma cutting system according to the conventional design.

FIG. 1 shows a conventional plasma arc cutting system 10 using a high frequency high voltage (HFHV) signal to initiate a pilot arc 12 between an electrode 14 and a nozzle 16 of a plasma arc torch 18. The arc then transfers to a workpiece 20 as a transferred arc 22. The transferred arc has a much larger current level than the pilot arc and therefore can conduct significantly more energy to the metal workpiece 20 than the pilot arc. A power console 23 includes a D.C. power supply which provides the electrical power for the start up and steady state operation. A typical power supply produces a D.C. current of 100 to 400 amperes at 150 to 200 volts of cutting voltage. A conventional electrical lead set 26 has a negative lead **26*a* connected from the negative output terminal of the power supply to the electrode 14. Electrical leads 26*b* and 26*c* connect from positive output terminals of the power supply to the nozzle 16 and workpiece 20, respectively. The torch 18 is of conventional design. By way of example and not limitation, torch 18** could be an HT400, PAC500, or MAX® 80/100/200 manufactured by Hypertherm, Inc.

A flow 28 of a plasma gas through the torch 18 is ionized by the pilot arc 12. A larger voltage drop is applied across the electrode and workpiece (lead **26*a* to lead 26*c*) than across the electrode and nozzle (lead 26*a* to lead 26*b*) in order to induce the arc to transfer to the workpiece once the gas in the electrode workpiece gap is ionized. With conventional starting circuits, such as shown in FIG. 2**, the time interval that the pilot arc remains attached to the nozzle, from starting the pilot arc to arc transfer is, in part, a function of the distance from the torch to the workpiece (standoff distance).

When the workpiece is a comparatively thick plate (e.g. ½ inch or more) a fairly large standoff (e.g. ⅜ inch) is used to reduce the problem of molten metal splashing upwardly onto the torch from the workpiece during initial piercing of the plate. Splashing occurs because during piercing, molten metal cannot flow under the influence of gravity through a cut kerr to the bottom of the plate and the force of the plasma jet on a pool of molten metal produces splashing. Splashing can deposit on the torch parts and cause double arcing or gouging. The increased standoffs necessary to sufficiently reduce splashing associated with piercing and cutting thick plates is problematic because it can increase the duration of the pilot arc attachment to the nozzle which reduces the life of the nozzle.

Figure 2:
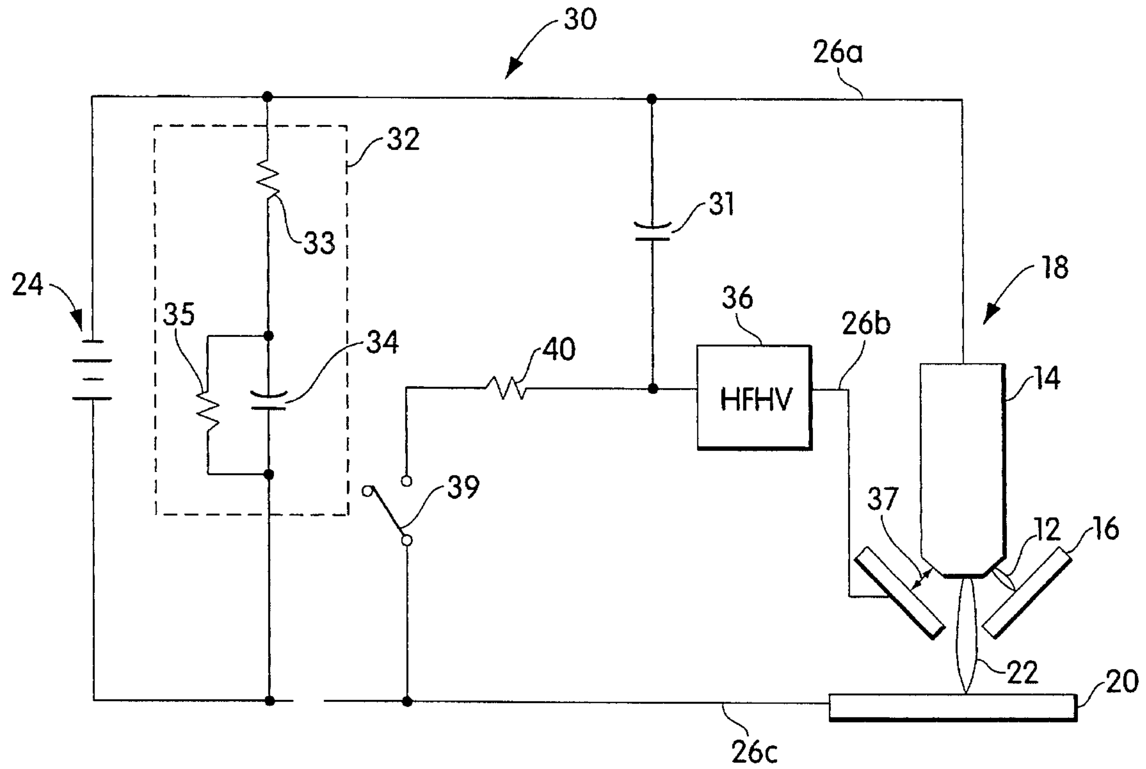
Fig. 2 (Prior Art)
FIG. 2 is a circuit diagram of a prior art starting circuit for a plasma arc cutting system of the type shown in FIG. 1.

FIG. 2 shows a conventional starting circuit 30 used to apply electrical power from the D.C. power supply 24 to the torch 18 and workpiece 20. Generally, the circuit of FIG. 2 isolates a pilot arc circuit and a transferred arc circuit before starting the pilot arc so that the transferred arc cannot utilize the pilot arc circuit. This isolation is accomplished by using two independent resistor/capacitor networks to provide the initial pilot arc and transferred current. On start up, the power supply 24 is at a zero current output and open circuit potential until the pilot arc ignites. A main surge circuit 32 formed by surge resistor 33 and surge capacitor 34 provides an instantaneous current source to the electrode-nozzle gap 37 as soon as it ionizes. Resistor 35 is a high resistance bleed resistor.

An HFHV generator 36 is typically of the Marcon type which generates high voltage ringing electrical impulses. A typical HFHV output signal useful for plasma arc ignition has a voltage in the 5–10 kV range and has a frequency in the 1–3 Mhz range. This signal propagates from the electrode 14 (the cathode) through capacitor 31 to the nozzle 16 (the anode). The high voltage between the electrode and the nozzle generates charge carriers in the plasma gas between these elements. These charge carriers create an electrical current path between the electrode and nozzle necessary to start an arc in the plasma gas. The voltage and time at which breakdown occurs is random for a given set of operating conditions, if it occurs at all.

The power supply ramps up to a steady state pilot arc current over a typical period of 1 to 2 msec. During this ramp up period, the surge injection circuit 32 ideally provides an initial current at a level sufficient to sustain the pilot arc 12 and, after the arc strikes, provides current at a level sufficient to sustain the transferred arc 22. The surge injection circuit 32 is connected in parallel with the power supply 24. The power supply 24 charges the surge capacitor to its open circuit voltage.

A pilot relay 39 and a pilot resistor 40 are connected between the positive lead **26*c* and the nozzle lead 26*b*. Torch operation is initiated by closing the pilot relay 39 which electrically connects resistor 40 into the circuit between the workpiece and the HFHV generator. The HFHV generator is then energized which ionizes the gas in the gap between the electrode 14 and the nozzle 16 providing a conductive path 37 which discharges capacitor 34 thereby providing current to the torch sufficient to initiate and sustain a pilot arc. The total current transferred to the pilot arc in this conventional arrangement is the sum of the current from capacitor 34 and the main current from the D.C. power supply 24. The resistive electrical path between the positive lead 26*c* and the nozzle lead 26*b* induces the arc to transfer to the workpiece after the pilot arc is struck because the total resistance between the electrode and workpiece along a path via the nozzle and resistor 40** is greater than the resistance presented by the ionized gas between the electrode and the workpiece directly. The pilot relay is opened after the pilot arc transfers.

The duration and the value of the energy flow in the pilot arc circuit is controlled by capacitor 34 to be sufficiently long enough to ignite the transferred arc but short enough not to damage the nozzle. This circuit works well for reducing the nozzle wear with a torch standoff as high as one-half inch. The circuit of FIG. 2 is, however, problematic because the total current through the electrode suddenly increases when the arc transfers to the workpiece. The current increases after transfer since the pilot resistor 40 no longer acts to limit the current flow. For certain plasma cutting systems, the step increase of the electrode current causes an increase in electrode wear. Also, the large voltage difference between the electrode and the nozzle results in the arc being directed back to the nozzle. The arc jumping back and forth between the nozzle and the workpiece before the pilot relay opens causes damage to the nozzle orifice.

Figure 3:
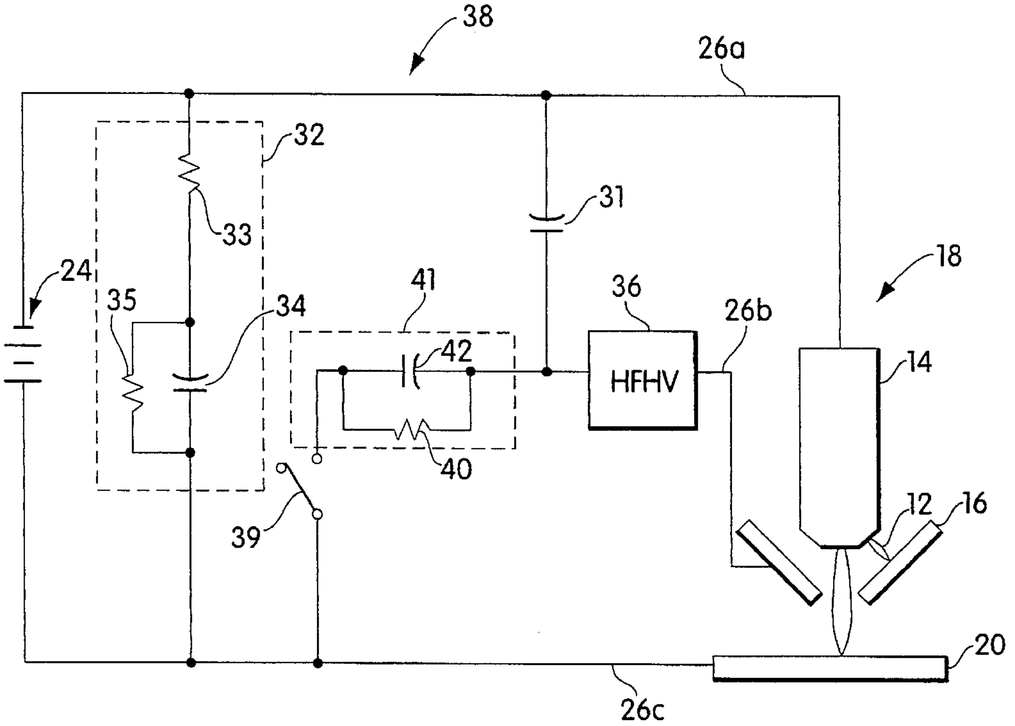
FIG. 3 is a circuit diagram of a starting circuit according to the present invention.

FIGS. 3–6 describe the features of the present invention. FIG. 3 is a circuit diagram of a starting circuit according to the present invention which controls the voltage between the nozzle and the workpiece for starting and transferring the plasma arc. The circuit of FIG. 3 differs primarily from the conventional starting circuit in that it includes a charge control network 41 connected in series between nozzle lead **26*b* and the workpiece lead 26*c*. The network includes a capacitor 42 connected in parallel with a resistor 40**.

Capacitor 34 is initially charged by the power supply 24 to its open circuit voltage. When torch operation is initiated by closing the pilot relay 39 and energizing the high frequency high voltage generator, capacitor 34 begins to discharge and capacitor 42 begins to charge causing the voltage between the nozzle and the workpiece to increase. After the arc transfers to the workpiece, the pilot relay 39 is opened. Capacitor 42 then discharges through resistor 40. Consequently, the pilot arc current and the nozzle voltage decrease. The arc transfers to the work quickly due to the increased voltage between the nozzle and the workpiece.

Capacitor 42 of the charge storage network 41 limits the initial current on pilot arc ignition. Thus according to the present invention, the total energy available to the pilot arc after ignition is determined by the capacitance value of capacitor 42 and not by the sum of the current supplied by the capacitor 34 and the current output of the power supply 24 as in the prior art starting circuits. The charge storage network of FIG. 3, therefore, serves to eliminate step increases of electrical current thereby reducing arc jumping between the nozzle and the workpiece.

Figure 4:
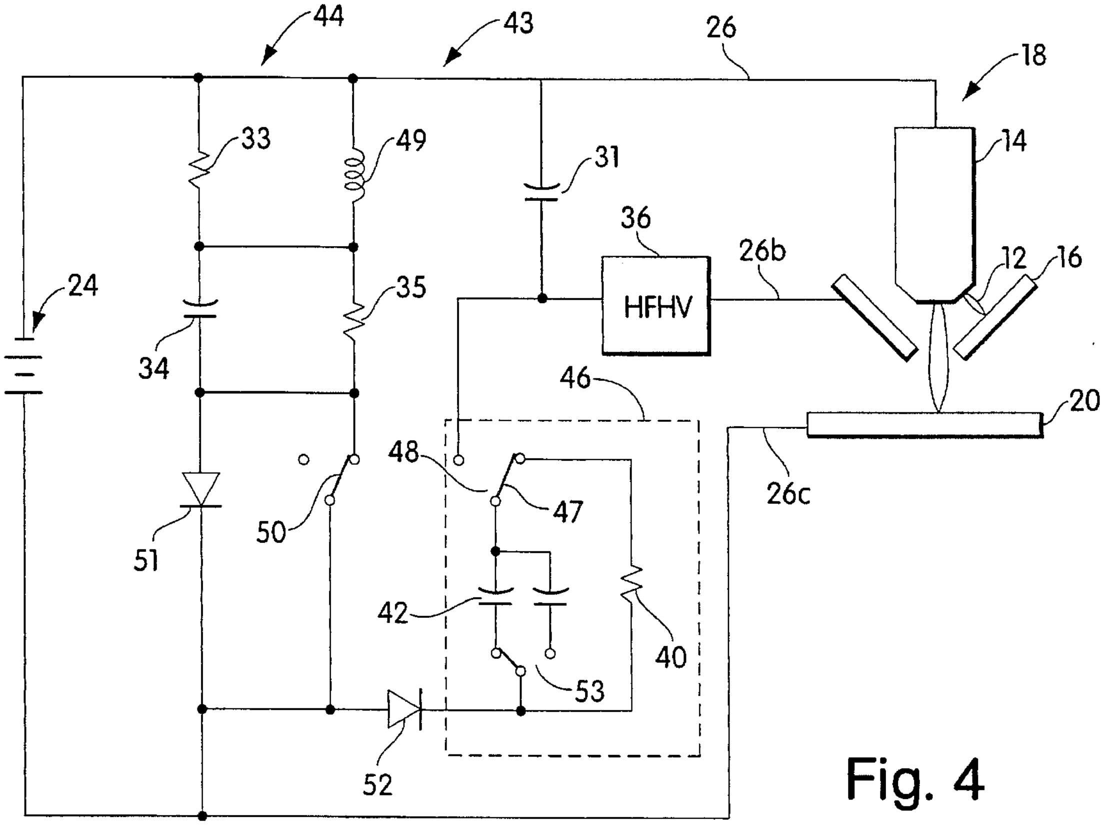
FIG. 4 is circuit diagram of the preferred starting circuit according to the present invention.

FIG. 4 is circuit diagram of another starting circuit according to the present invention. The starting circuit includes an inductor-capacitor surge injection circuit which produces a generally constant pilot arc current for a short time even when the voltage across the capacitor 42 ramps up quickly. Like the circuit of FIG. 3, the pilot arc circuit includes a high resistance bleed resistor 35 to drain residual energy from the surge capacitor 34. The circuit also includes a charge control network 46 that includes a resistor 40 connected in parallel with a capacitor 42. The capacitance value of capacitor 42, however, is variable. A diode network isolates the pilot arc circuit from the transfer circuit.

The inductor-capacitor surge injection circuit includes inductor 49 connected in series with capacitor 34. Relay contact 50 is set to the closed position prior to the torch ignition to allow capacitor 34 to charge to the power supply open circuit voltage. Relay contact 50 is then opened and the torch is ignited by the HFHV source 36. The inductor is used to provide a square pulse shape to the surge injection discharge current. The capacitance value of capacitor 34 and inductance value of inductor 49 are selected so that they produce a generally constant pilot current level over a brief time interval.

The diode network protects the circuit from voltage reversal. Diode 51 discharges the inductor 49 rapidly when the voltage reverses. Diode 52 protects capacitor 42 against the voltage reversal.

Some applications require the use of different plasma gases or different types of consumables. To produce suitable pilot arc current waveforms, such changes may require the use of a different capacitance values for pilot arc capacitor 42. In order to change the capacitance, a relay 53 may be used to select different values of capacitance 42.

The circuit of FIG. 4 transfers arcs reliably for both oxygen and nitrogen plasma gases. By way of example, the circuit in FIG. 4 maybe utilized in an HT4000 plasma arc torch manufactured by Hypertherm. The inductor 49 has an inductance of 1.5 mH. Resistor 33 and 40 have resistances of 2Ω. The capacitor 31 has a capacitance of 0.022μF and is used for high frequency bypassing. Capacitor 34 is 510μF and resistor 35 is 10K. The open circuit voltage of power supply 24 is typically 275 volts D.C.

With such parameters, the pilot arc has a current of 40 to 100 amperes. When a ⅜" torch standoff is used, the pilot arc time is typically about 0.2 to 0.3 milliseconds. The nozzle-to-work voltage increases from zero to 80 volts during this short time and maintains this value after the arc transfers for about 100 milliseconds. The pilot arc current is generally constant in the range of 50 amps before transferring. As a result, the nozzle wear is reduced dramatically a compared to the standard start circuit and the electrode life is not affected because of the smooth ramp up of the electrode current.

Figure 5:
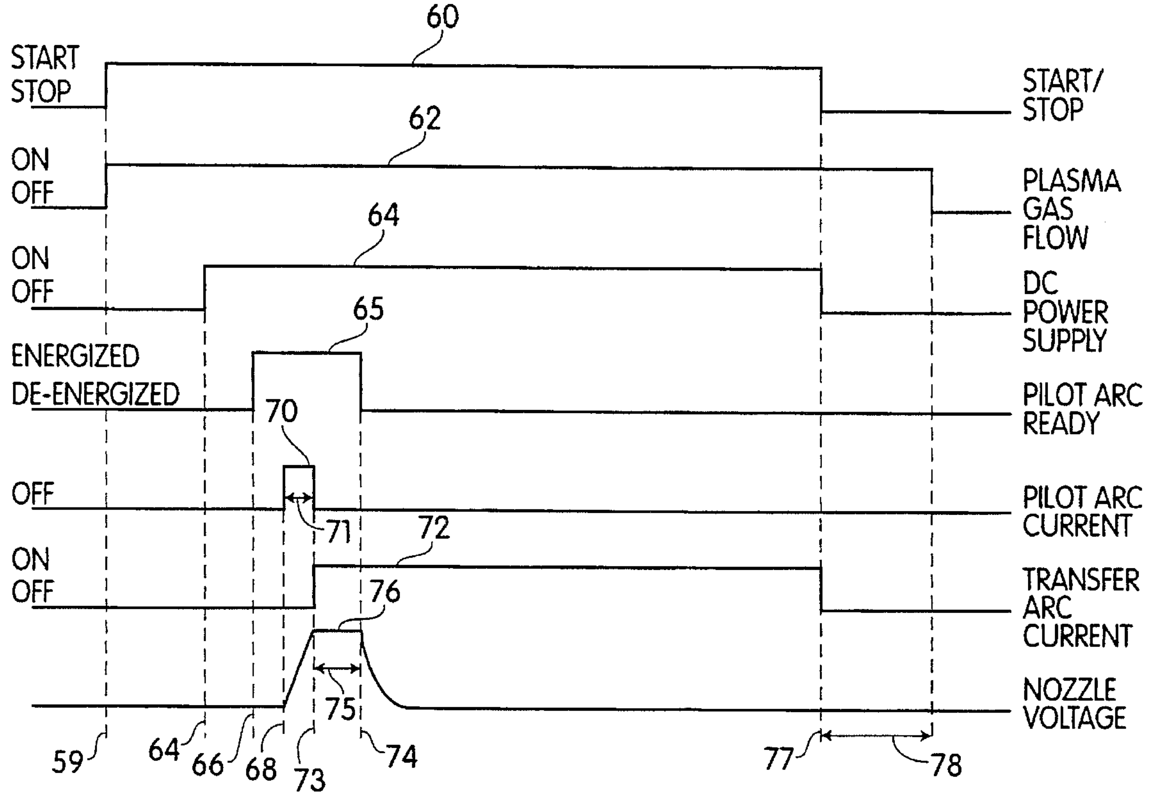
FIG. 5 is a timing diagram according to the present invention for the circuit shown in FIG. 4 showing the simultaneous state of system parameters during torch start up as a function of time.

FIG. 5 is a timing diagram according to the present invention for the circuit shown in FIG. 4 showing the simultaneous state of system parameters during torch start up as a function of time. A start signal 60 initiates torch operation at a time 59. Plasma gas flow 62 is initiated with the start signal 60 at time 59. After a fixed period of pre-flow gas, the D.C. power supply is activated at time 64 allowing capacitor 34 to charge. Once the capacitor is fully charged, at time 66, the pilot arc relay is energized 65 by configuring the relay in position 48. This isolates the pilot arc circuit from the transferred arc circuit and thus any energy to the nozzle 16 is generated by the pilot arc circuit alone.

The high frequency high voltage signal is initiated at time 68. The plasma gas flowing between the electrode and the nozzle is quickly ionized thus initiating the pilot arc 12 as indicated by the step function increase in the pilot arc current in waveform 72. At time 73, the HFHV signal is terminated. Nozzle voltage 76 ramps up during the pilot arc time 71 and remains constant after the pilot arc transfers. Typically the pilot arc time 71 is on order of approximately 1 msec. This interval does, however, vary with operating conditions such as gas flow rate and standoff.

At time 73, the pilot arc transfers allowing arc current 72 to flow. The pilot arc relay is de-energized with a time delay 75 after the arc transfers and the nozzle voltage drops at the same time by discharging the pilot capacitor through the resistor. The nozzle voltage ramps down at time 74 after the arc has transferred. The arc is turned off at time 77. There is a post flow time of plasma gas during time 78 after the arc is turned off to purge the torch.

The pilot arc duration and power level are controlled primarily by capacitor 42, resistor 40, and inductor 49. The value of the maximum current in this pulse varies depending upon the application. A typical value for high current systems is 80 amperes. The duration of the pilot arc pulse 72 is typically 2–3 msec. The pilot arc duration of conventional circuits is about 100 msec when a standoff distance of ⅜ inch is used. This represents as much as a 98% reduction in time. This reduction increases nozzle life by approximately 3–5 times when compared to conventional nozzle life under the same operating conditions.

Figure 6:
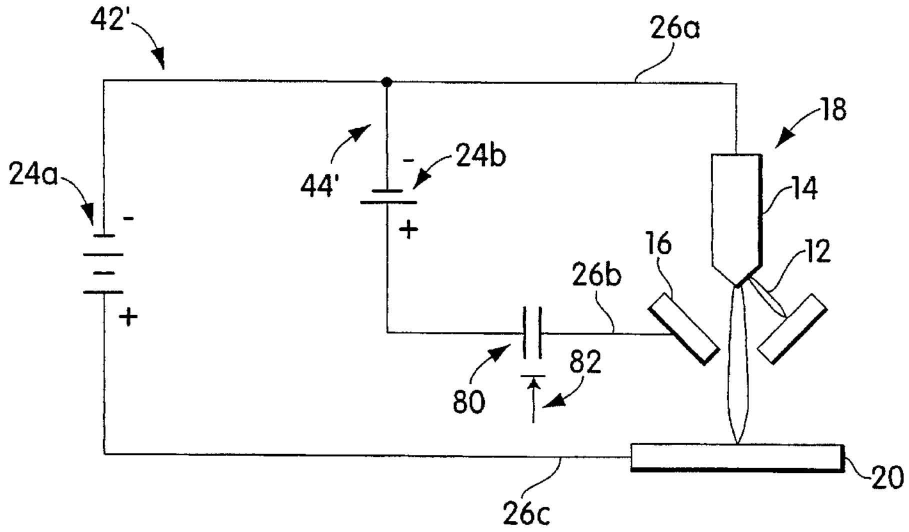
FIG. 6 is an alternative embodiment of a plasma arc cutting system according to the present invention.

FIG. 6 is another alternative embodiment of a plasma arc cutting system according to the present invention. In an alternate form, an active current source **24*b*** is used in the pilot arc loop. The source provides a step current output when the HFHV source induces a spark between the electrode and the nozzle. The active current source is advantageous because it provides a constant pilot arc current independent of consumable types and current levels.

The pilot arc circuit includes the active current source **24*b*, a negative lead 26*a*, a positive lead 26*b*, and a switch 80. The active current source is connected to the electrode 14 by lead 26*a*. The positive terminal of the source is connected to the nozzle 16 by positive lead 26*b* through switch 80. The switch is controlled by control lead 82 which is responsive to a control circuit (not shown) preprogrammed to operate according to the timing diagram of FIG. 5**. The switch can be any of a wide variety of conventional type devices such as a solid state relay.

Equivalents

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method of starting a plasma arc torch for cutting a workpiece using a pilot voltage to ionize a plasma gas and generate a pilot arc between an electrode and a nozzle, the method comprising:

connecting a power source to the electrode, the nozzle and the workpiece by a charge control network;

providing a signal between the nozzle and the workpiece having a magnitude which generally increases after the pilot arc has been generated to expedite transfer of the arc from the nozzle to the workpiece;

maintaining the signal after transfer of the arc to the workpiece at a generally constant magnitude sufficient to allow the transferred arc to stabilize; and discharging the signal after the transferred arc has stabilized.

2. The method of claim 1 wherein the signal is a voltage.

3. The method of claim 2 wherein the voltage is applied to a capacitor disposed between the nozzle and the workpiece.

4. The method of claim 3 wherein the power source and a surge injection circuit charge the capacitor to provide a voltage having generally increasing magnitude.

5. The method of claim 3 wherein the voltage discharges through a resistor connected in parallel with the capacitor.

6. The method of claim 1 wherein the signal is maintained at a generally constant magnitude sufficient to minimize transfer of the arc back to the nozzle.

7. The method of claim 1 further comprising providing a generally smooth current waveform to the electrode before, during and after the arc transfers to the workpiece.

8. The method of claim 1 wherein the pilot signal is a high frequency high voltage signal.

9. The method of claim 1 wherein the power source is a D.C. power supply.

10. A method of starting a plasma arc torch for cutting a workpiece using a high frequency high voltage signal to ionize a plasma gas to generate a pilot arc between an electrode and a nozzle, the method comprising:

connecting a D.C. power source to the electrode, the nozzle and the workpiece by a charge control network;

providing a signal to an element disposed between the nozzle and the workpiece having a magnitude which generally increases after generation of the pilot arc to expedite transfer of the arc from the nozzle to the workpiece;

maintaining the signal once the arc transfers to the workpiece at a generally constant magnitude sufficient to minimize transfer of the arc back to the nozzle, thereby allowing the transferred arc to stabilize; and discharging the signal after the transferred arc has stabilized.

11. The method of claim 10 wherein the element is a capacitor.

12. The method of claim 10 wherein the signal is a voltage.

13. The method of claim 10 wherein a surge injection circuit and the power supply charge the capacitor to provide a signal of increasing magnitude.

14. The method of claim 10 wherein the signal discharges through a resistor connected in parallel with the capacitor.

15. The method of claim 10 further comprising providing a generally smooth current waveform to the electrode after the arc transfers to the workpiece.

16. A method of starting a plasma arc torch for cutting a workpiece including an electrode, a nozzle and a plasma gas flow, the method comprising:

connecting a D.C. power source to the electrode, the nozzle and the workpiece by a start circuit;

closing a relay electrically disposed between the nozzle and the workpiece;

generating a high frequency high voltage signal to ionize a plasma gas to generate a pilot arc between an electrode and a nozzle;

providing a transfer voltage across a capacitor electrically disposed between the nozzle and the workpiece having a magnitude which generally increases after the pilot arc has been generated to expedite transfer of the arc from the nozzle to the workpiece;

maintaining the transfer voltage once the arc transfers to the workpiece at a generally constant magnitude sufficient to minimize transfer of the arc back to the nozzle, thereby allowing the transferred arc to stabilize;

opening the relay after the transferred arc has stabilized; and discharging the transfer voltage through a resistor connected to the capacitor after the relay is opened.

17. A starting circuit for a plasma arc torch having an electrode, a nozzle and a plasma gas flow between the electrode and the nozzle, comprising:

a D.C. power source coupled to the electrode, the nozzle and a workpiece disposed adjacent the torch;

a pilot circuit having a generator for providing a high frequency high voltage signal for ionizing plasma gas to generate a pilot arc between an electrode and a nozzle; and a transfer circuit comprising a parallel combination of a capacitor and a resistor electrically connectable between the nozzle and the workpiece and a relay electrically connected in series with the parallel combination for connecting the parallel combination to the workpiece, the transfer circuit providing a transfer signal between the nozzle and the workpiece, the transfer signal having (i) a magnitude which generally increases after the pilot arc has been generated to expedite transfer of the arc from the nozzle to the workpiece, (ii) a generally constant magnitude once the arc transfers to the workpiece for minimizing transfer of the arc back to the nozzle, thereby allowing the transferred arc to stabilize, and (iii) a magnitude which generally decreases to discharge the transfer signal after the transferred arc has stabilized. element having a magnitude which increases after the pilot arc has been generated.

18. The starting circuit of claim 17 wherein the charge storage circuit element is a capacitor.

19. The starting circuit of claim 17 further comprising an inductor-capacitor surge injection circuit that produces a generally constant pilot arc current from the signal.

20. The starting circuit of claim 17 further comprising a diode network isolating the pilot arc circuit from the transfer circuit.

21. The starting circuit of claim 17 further comprising an active current supply in the pilot circuit.

* * * * *